United States Patent
Tsao (10) Patent No.: US 12,556,362 B2
(45) Date of Patent: Feb. 17, 2026

(54) RECEIVER AND CLOCK AND DATA RECOVERY METHOD THEREOF

(71) Applicant: REALTEK SEMICONDUCTOR CORPORATION, Hsinchu (TW)

(72) Inventor: Meng-Chieh Tsao, San Jose, CA (US)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 173 days.

(21) Appl. No.: 18/614,780

(22) Filed: Mar. 25, 2024

(65) Prior Publication Data
US 2025/0300804 A1 Sep. 25, 2025

(51) Int. Cl.
*H04L 7/033* (2006.01)
*H04L 7/00* (2006.01)

(52) U.S. Cl.
CPC .......... *H04L 7/0331* (2013.01); *H04L 7/0025* (2013.01); *H04L 7/0087* (2013.01)

(58) Field of Classification Search
CPC ...... H04L 7/033; H04L 7/0025; H04L 7/0087
See application file for complete search history.

(56) References Cited

U.S. PATENT DOCUMENTS

| | | | |
|---|---|---|---|
| 8,742,807 B1 * | 6/2014 | Muthali | H03L 7/00 327/146 |
| 9,231,752 B1 | 1/2016 | Yan et al. | |
| 9,800,438 B1 * | 10/2017 | Zhang | H04L 25/03885 |
| 10,224,937 B1 * | 3/2019 | Wu | H04L 12/437 |
| 10,985,764 B1 | 4/2021 | Lin et al. | |
| 11,165,431 B1 * | 11/2021 | Kenney | H03L 7/0814 |
| 2007/0075759 A1 * | 4/2007 | Metz | H04L 7/0037 327/158 |

FOREIGN PATENT DOCUMENTS

CN 106612114 A 5/2017
EP 3160077 B1 12/2019

OTHER PUBLICATIONS

OA letter of a counterpart TW application (appl. no. 114105812) mailed on Nov. 28, 2025.

* cited by examiner

*Primary Examiner* — Freshteh N Aghdam
(74) *Attorney, Agent, or Firm* — WPAT, PC (57) ABSTRACT

A receiver includes an analog to digital converter circuit, a phase detector circuit, a digital loop filter circuit, a phase interpolator circuit, and a bias adaption circuit. The analog to digital converter circuit is configured to convert a first signal into a second signal according to a clock signal. The phase detector circuit is configured to detect a phase of the second signal to generate a phase detection signal. The digital loop filter circuit is configured to scale the phase detection signal with a proportional path gain coefficient and a bias value to generate a third signal. The phase interpolator circuit is configured to generate the clock signal according to the third signal. The bias adaptation circuit is configured to accumulate the phase detection signal to generate the bias value.

20 Claims, 7 Drawing Sheets

RECEIVER AND CLOCK AND DATA
RECOVERY METHOD THEREOF

BACKGROUND OF THE INVENTION

1. Field of the Invention

The present disclosure relates to a receiver device. More particularly, the present disclosure relates to a receiver that processes phase errors and a clock and data recovery (CDR) method thereof.

2. Description of Related Art

In the receiver, the clock and data recovery mechanisms are crucial, ensuring the receiver accurately and reliably receives data. Current clock and recovery mechanisms typically employ second order (or higher orders) loop filters to track frequency and phase errors separately. However, the integral path in the second order loop filter often processes the input signal with a significantly larger magnitude of multiplication, demanding greater precision on circuit design. This requirement leads to a significant increase in latency across the entire system.

SUMMARY OF THE INVENTION

In some aspects, a receiver includes an analog to digital converter circuit, a phase detector circuit, a digital loop filter circuit, a phase interpolator circuit, and a bias adaption circuit. The analog to digital converter circuit is configured to convert a first signal into a second signal according to a clock signal. The phase detector circuit is configured to detect a phase of the second signal to generate a phase detection signal. The digital loop filter circuit is configured to scale the phase detection signal with a proportional path gain coefficient and a bias value to generate a third signal. The phase interpolator circuit is configured to generate the clock signal according to the third signal. The bias adaptation circuit is configured to accumulate the phase detection signal to generate the bias value.

In some aspects, a clock and data recovery method includes the following operations: converting a first signal into a second signal according to a clock signal; generating a phase detection signal according to a phase of the second signal; scaling the phase detection signal with a proportional path gain coefficient and a bias value to generate a third signal; generating the clock signal according to the third signal; and accumulating the phase detection signal to generate the bias value.

These and other objectives of the present disclosure will no doubt become obvious to those of ordinary skill in the art after reading the following detailed description of the preferred embodiments that are illustrated in the various figures and drawings.

DETAILED DESCRIPTION OF THE
PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, similar/identical elements in various figures are designated with the same reference number.

Figure 1:
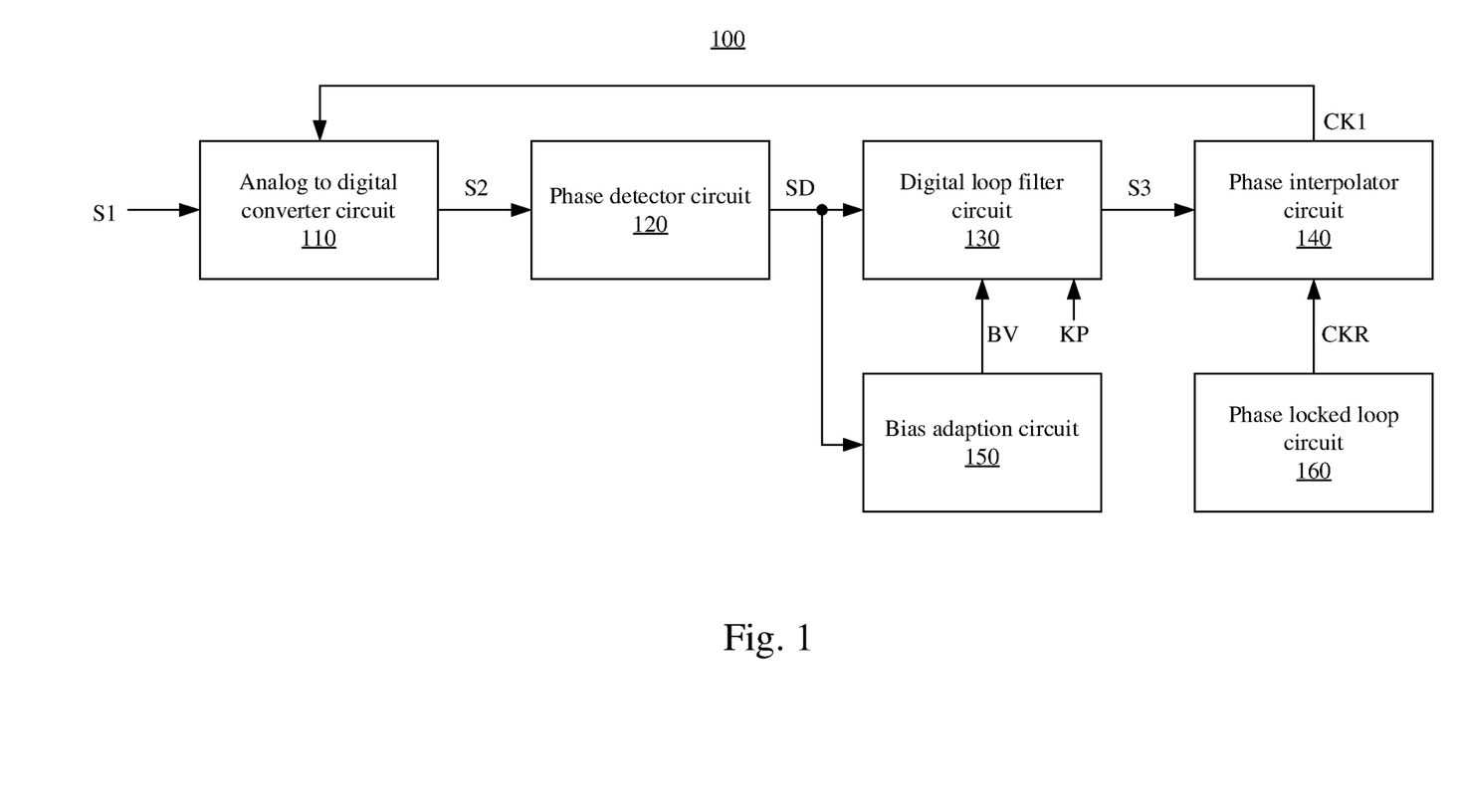
FIG. 1 illustrates a schematic diagram of a receiver according to some embodiments of the present disclosure.

FIG. 1 illustrates a schematic diagram of a receiver 100 according to some embodiments of the present disclosure. The receiver 100 may be applied to or be inside part of various electronic devices, which may include, for example but not limited to, smartphone, laptop, personal computer, tablet, and so on.

In some embodiments, the receiver 100 may include an analog to digital converter (ADC) circuit 110, a phase detector circuit 120, a digital loop filter circuit 130, a phase interpolator circuit 140, a bias adaption circuit 150, and a phase locked loop circuit 160. The analog to digital converter circuit 110 is configured to receive a signal S1 and convert the signal S1 into a signal S2 according to a clock signal CK1. In some embodiments, the analog to digital converter circuit 110 may be various types of analog digital converter circuits, which may include, for example but not limited to, a sigma-delta analog to digital converter circuit, a successive approximation register analog to digital converter circuit, a pipeline analog to digital converter circuit, a digital slope analog to digital converter circuit, or the like.

The phase detector circuit 120 is configured to detect a phase of the signal S2 to a phase detection signal SD. In some embodiments, the phase detection signal SD may represent a phase difference between the signal S2 and a reference signal (not shown). The digital loop filter circuit 130 is configured to scale (or filter) the phase detection signal with a proportional path gain coefficient KP and a bias value BV to generate a signal S3. In some embodiments, the proportional path gain coefficient KP may be stored in a register circuit (not shown) in the digital loop filter circuit, but the present disclosure is not limited thereto. In some embodiments, the digital loop filter circuit 130 is a first-order loop filter circuit. For example, the digital loop filter circuit 130 may generate the signal S3 with a proportional path only. In other words, the digital loop filter circuit 130 may generate the signal S3 without employing an integral path. In some embodiments, the proportional path is utilized to mainly track phase errors, while the integral path is utilized to mainly track frequency errors. In practical applications, the integral path takes more processing time to achieve higher precision on tracking frequency errors, resulting in a higher latency of the whole system. Thus, without employing the integral path, the digital loop filter circuit 130 may keep the latency lower to improve the performance of the receiver 100. Moreover, in some embodiments, the bias value BV is introduced to the digital loop filter circuit 130 to adjust an input or an output of the proportional path in the digital loop filter circuit 130, in order to reduce impacts from potential frequency errors.

The phase interpolator circuit 140 is configured to generate the clock signal CK1 according to the signal S3. The phase locked loop circuit 160 is configured to generate a reference clock signal CKR and transmit the same to the phase interpolator circuit 140. The phase interpolator circuit 140 may generate the clock signal CK1 according to the reference clock signal CKR and adjust the phase of the clock signal CK1 according to the signal S3.

The bias adaption circuit 150 is configured to accumulate the phase detection SD to generate the bias value BV. In some embodiments, the bias adaption circuit 150 is further configured to reset the accumulated phase signal SD after the bias value BV is further estimated and updated. As mentioned above, the digital loop filter circuit 130 may generate the signal S3 without employing the integral path that tracks frequency errors. Under this condition, the output of the phase detector circuit 120 (e.g., the phase detection signal SD) may be at non-zero level due to potential frequency errors, causing the phase interpolator circuit 140 to incorrectly adjust the phase of the clock signal CK1. To compensate this non-zero level, the bias adaption circuit 150 is employed to generate the bias value BV, such that the digital loop filter circuit 130 is able to correct the phase detection signal SD with the bias value BV. Moreover, as operations of the bias adaption circuit 150 are asynchronous to the digital loop filter circuit 130, the bias adaption circuit 150 may operate in background, and thereby not introducing excessive latency to the digital loop filter circuit 130. Exemplary arrangements of the bias adaption circuit 150 will be described with reference to FIG. 2B and FIG. 3B, but the present disclosure is not limited thereto.

In some experimental examples, under the condition that the amount of frequency error(s) is set to be 100 parts per million (ppm), if the bias value BV is not utilized, the timing of the analog to digital converter circuit 110 sampling the signal S1 may shifted from about 0 unit-interval (UI) to about 0.15 UI. If the bias value BV is added to correct the phase detection signal SD, the timing of the analog to digital converter circuit 110 sampling the signal S1 is able to be calibrated back to the 0 UI. The above values and timing in the experimental examples can be observed with the eye diagram analysis. Moreover, in the above experimental examples, if the bias value BV is not utilized, a signal-to-noise ratio (SNR) of the output of a system that employs the receiver 100 is about 16 decibels (dB). If the bias value BV is applied, the SNR is able to be increased to be about 23 dB.

Figure 2A:
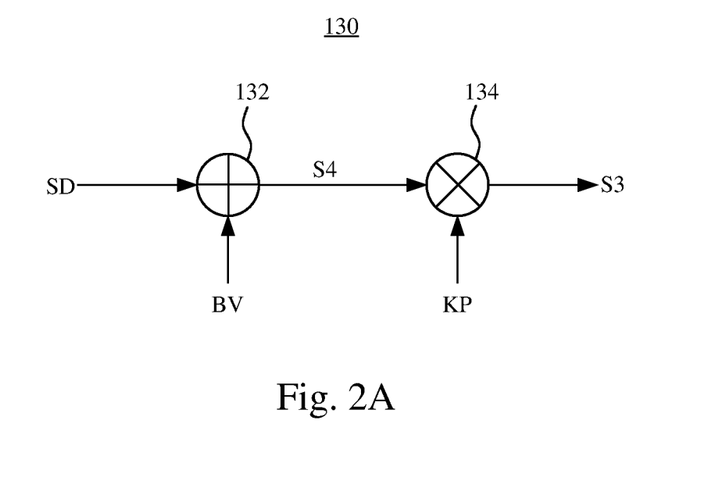
FIG. 2A illustrates a schematic diagram of the digital loop filter circuit in FIG. 1 according to some embodiments of the present disclosure.

FIG. 2A illustrates a schematic diagram of the digital loop filter circuit 130 in FIG. 1 according to some embodiments of the present disclosure. In some embodiments, the digital loop filter circuit 130 includes a proportional path, and the bias value BV is to adjust an input of the proportional path. For example, the digital loop filter circuit 130 includes an adder circuit 132 and a multiplier circuit 134. The adder circuit 132 may be configured to add the bias value BV and the phase detect signal SD to generate a signal S4. The multiplier circuit 134 may be configured to multiply the signal S4 with the proportional path gain coefficient KP to generate the signal S3. In the above example, the multiplier circuit 134 may be considered as the proportional path. Alternatively, in some other perspectives, the multiplier circuit 134 and the adder circuit 132 may be together considered as the proportional path. In some embodiments, the bias value BV may be a positive value or a negative value (depend on practical phase errors). With such configurations, the signal S3 generated by adding the phase detection signal SD and the bias value BV will be close to or equal to zero.

Figure 2B:
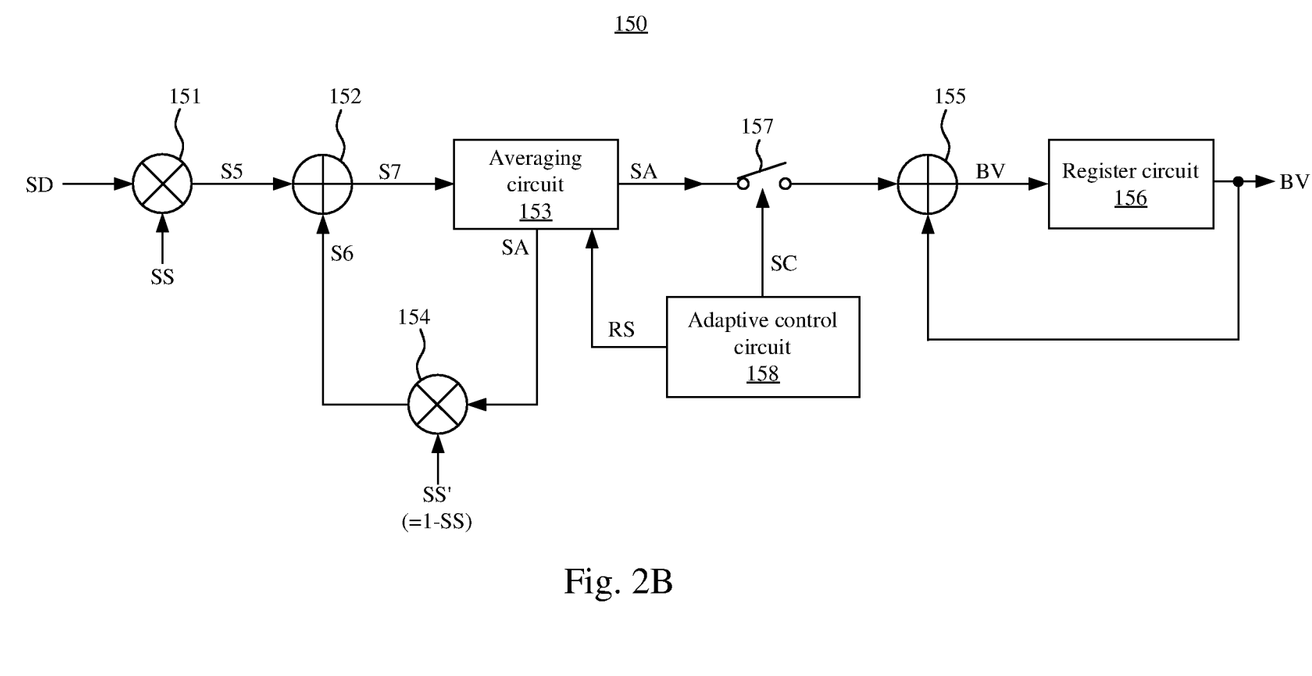
FIG. 2B illustrates a schematic diagram of the bias adaption circuit in FIG. 1 according to some embodiments of the present disclosure.

FIG. 2B illustrates a schematic diagram of the bias adaption circuit 150 in FIG. 1 according to some embodiments of the present disclosure. In some embodiments, the bias adaption circuit 150 may include a multiplier circuit 151, an adder circuit 152, an averaging circuit 153, a multiplier circuit 154, an adder circuit 155, and a register circuit 156. The multiplier circuit 151 may be configured to multiply the phase detection signal SD with a step size value SS to generate a signal S5. The adder circuit 152 may be configured to add the signal S5 and a signal S6 to generate a signal S7. The averaging circuit 153 may be configured to accumulate the signal S7 for a predetermined interval and average the accumulated signal S7 to generate an averaging signal SA. In some embodiments, when the predetermined interval is expired, the accumulated signal S7 may be considered to be converged, and thus the averaging circuit 153 may output the averaging signal SA to the adder circuit 155 accordingly. The multiplier circuit 154 may be configured to multiply the averaging signal SA with a step size value SS' to generate the signal S6. In some embodiments, the step size value SS' is higher than the step size value SS. In some embodiments, the step size value SS' may be generated based on the step size value SS. For example, the step size value SS' may be a difference between a value of 1 and the step size value SS, which may be expressed as SS'=1−SS. With such configuration, in during the process of updating the averaging signal SA, the previous determined averaging signal SA will carry a higher weighting (e.g., the step size value SS') until the averaging signal SA is outputted to the adder circuit 155. The adder circuit 155 may be configured to add the averaging signal SA and the bias value BV to update the bias value BV. The register circuit 156 may be configured to store the bias value BV.

In some further embodiments, the bias adaption circuit 150 further includes a switch circuit 157 and an adaptive control circuit 158. The switch circuit 157 may be configured to selectively turned on according to a control signal SC to transmit the averaging signal SA to the adder circuit 155.

For example, as noted above, when the predetermined interval is expired, the accumulated signal S7 may be considered to be converged. Under this condition, the switch circuit 157 may be turned on according to the control signal S7, allowing the averaging circuit 153 to transmit the averaging signal SA to the adder circuit 155 through the switch circuit 157. The adaptive control circuit 158 may be configured to output control signal SC and a reset signal RS when the predetermined interval is expired. The averaging circuit 153 may be further configured to clear (or reset) the accumulated signal S7 and the averaging signal SA according to the reset signal RS after the predetermined interval is expired. In other words, once the bias value BV is updated (i.e., the switch circuit 157 is turned on transmit the averaging signal SA to the adder circuit 155), the signal S3 in FIG. 1 will be updated correspondingly to adjust the phase of the clock signal CK1. Under this condition, the averaging circuit 153 clears (or resets) the accumulated signal S7 and the averaging signal SA to re-execute the same operations under the adjusted phase of the clock signal CK1, in order to provide the averaging signal SA that corresponds to the adjusted phase of the clock signal CK1.

In some embodiments, the adaptive control circuit 158 is configured to set the step size value SS and the step size value SS'. In some embodiments, the adaptive control circuit 158 may be implemented with digital logic circuit(s) that executes a predetermined algorithm (or predetermined operations). For example, the adaptive control circuit 158 may be implemented with digital logic circuit(s) that executes a state machine that corresponds to operations shown in FIG. 2C, but the present disclosure is not limited thereto.

Figure 2C:
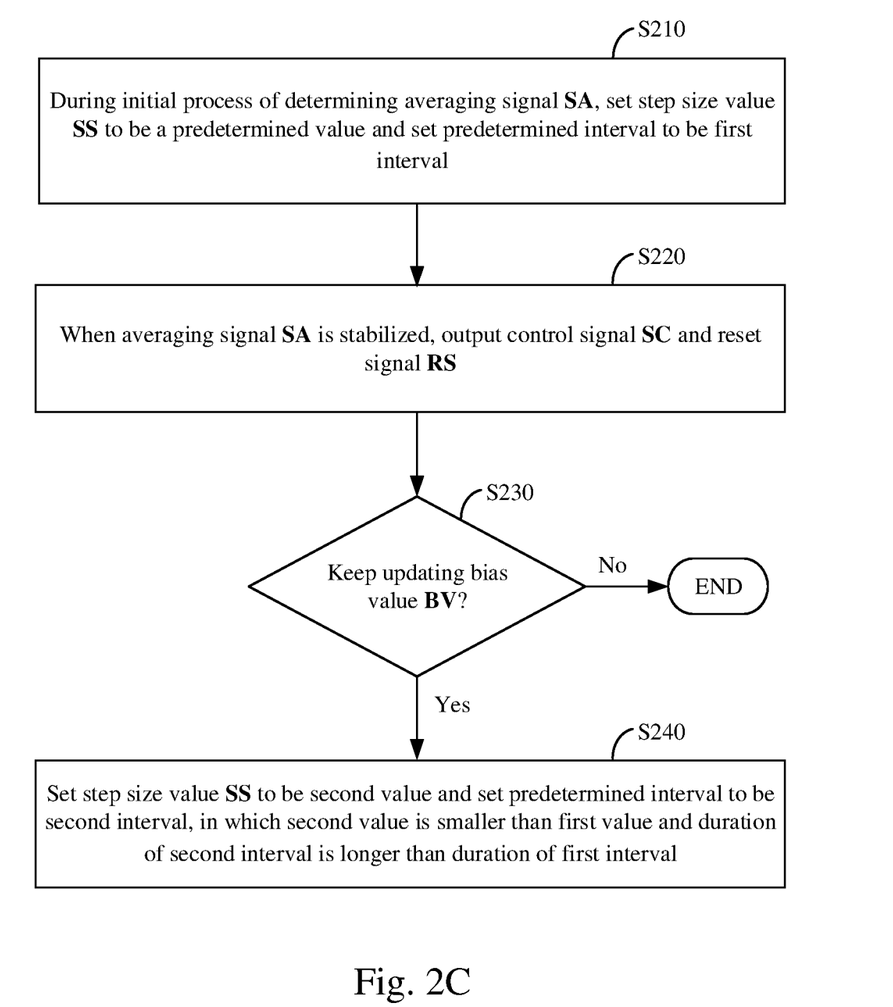
FIG. 2C illustrates a flow chart of operations performed by the adaptive control circuit in FIG. 2B according to some embodiments of the present disclosure.

FIG. 2C illustrates a flow chart of operations performed by the adaptive control circuit 158 in FIG. 2B according to some embodiments of the present disclosure. In operation S210, during an initial process of determining the averaging signal SA, the step size value SS is set to be a predetermined value and the predetermined interval is set to be a first interval. In operation S220, when the averaging signal SA is stabilized, the control signal SC and the reset signal RS are outputted. For example, when the receiver 100 in FIG. 1 is first powered on, the adaptive control circuit 158 may perform the initial process of determining the averaging signal SA. Under this condition, the adaptive control circuit 158 may set the step size value SS to be the predetermined value and set the predetermined interval to be the first interval, such that other circuits shown in FIG. 1, FIG. 2A, and FIG. 2B will perform the aforementioned operations to generate the averaging signal SA. Once the predetermined interval is expired, the averaging signal SA is considered to be stabilized (i.e., converged), and thus the adaptive control circuit 158 may output the control signal SC to turn on the switch circuit 157 and output the reset signal RS to control the averaging circuit 153 to clear the averaging signal SA.

In operation S230, whether to keep updating the bias value BV is determined. If it is determined not to keep updating the bias value BV, the updating process is ended. Alternatively, if it is determined to keep updating the bias value BV, operation S240 is performed. For example, as the operation time increases or the usage temperature changes, the phase of the clock signal CK1 may drift again. The adaptive control circuit 158 may determine whether to keep updating the bias value BV to reduce impacts from potential phase error(s) by monitoring the averaging signal SA. If the averaging signal SA is detected to be higher than a predefined threshold, the adaptive control circuit 158 may keep updating the bias value BV to adjust the phase of the clock signal CK1. The above configuration of determining whether to keep updating the bias value BV is given for illustrative purposes, and the present disclosure is not limited thereto.

In operation S240, the step size value SS is set to be a second value and the predetermined interval is set to be a second interval, in which the second value is smaller than the first value and a duration of the second interval is longer than a duration of the first interval. After the initial process is completed, if the updating process is determined to be kept performed, the adaptive control circuit 158 may set the step size value SS to be a smaller value, and set the predetermined interval to be a longer interval, in order to maintain the circuit stability. That is, when the initial process is performed, most amounts of phaser errors are considered to be compensated. If the phase of the clock signal CK1 drifts again, the amount of the phase errors is considered to be relatively lower, and thus the digital loop filter circuit 130 may take a sufficient time to track the phase errors and update the bias value BV to adjust the phase of the clock signal CK1 again.

Figure 3A:
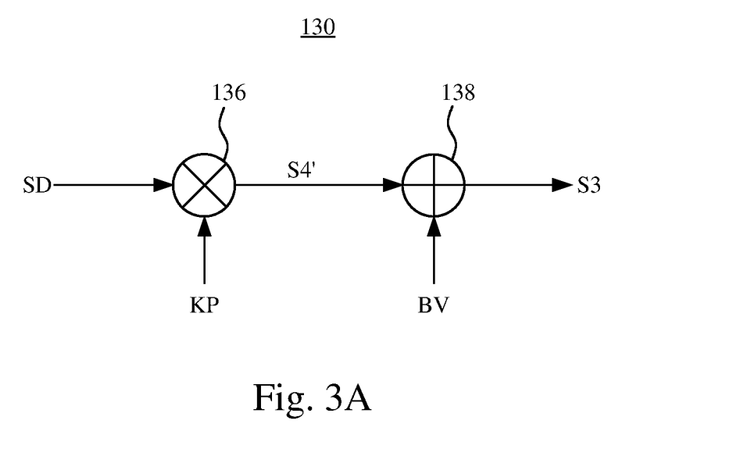
FIG. 3A illustrates a schematic diagram of the digital loop filter circuit in FIG. 1 according to some embodiments of the present disclosure.

FIG. 3A illustrates a schematic diagram of the digital loop filter circuit 130 in FIG. 1 according to some embodiments of the present disclosure. In some embodiments, the digital loop filter circuit 130 includes a proportional path, and the bias value BV is to adjust an output of the proportional path. For example, the digital loop filter circuit 130 includes a multiplier circuit 136 and an adder circuit 138. The multiplier circuit 136 is configured to multiply the phase detection signal SD with the proportional path gain coefficient KP to generate a signal S4'. The adder circuit 138 may be configured to add the signal S4' and the bias value BV to generate the signal S3. In the above example, the multiplier circuit 136 may be considered as the proportional path. Alternatively, in some other perspectives, the multiplier circuit 136 and the adder circuit 138 may be together considered as the proportional path.

Figure 3B:
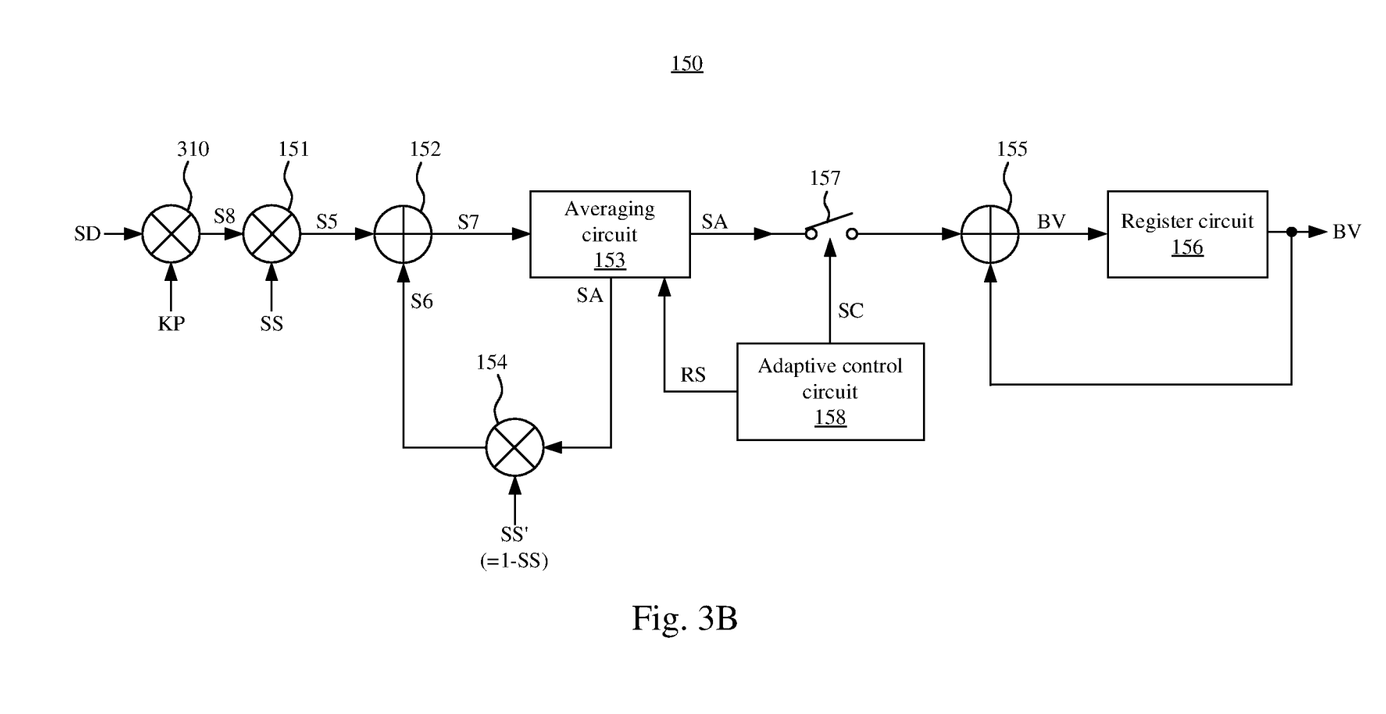
FIG. 3B illustrates a schematic diagram of the bias adaption circuit in FIG. 1 according to some embodiments of the present disclosure.

FIG. 3B illustrates a schematic diagram of the bias adaption circuit 150 in FIG. 1 according to some embodiments of the present disclosure. Compared with examples in FIG. 2B, in this example where the digital loop filter circuit 130 is implemented with configuration shown in FIG. 3A, the bias adaption circuit 150 may further include a multiplier circuit 310. The multiplier circuit 310 may be configured to multiply the phase detection signal SD with the proportional path gain coefficient KP to generate a signal S8. Correspondingly, the multiplier circuit 151 may be configured to multiply the signal S8 with the step size value SS to generate the signal S5. Operations of the remaining circuits are the same as those in FIG. 2B, and thus the repetitious descriptions are not further given.

Figure 4:
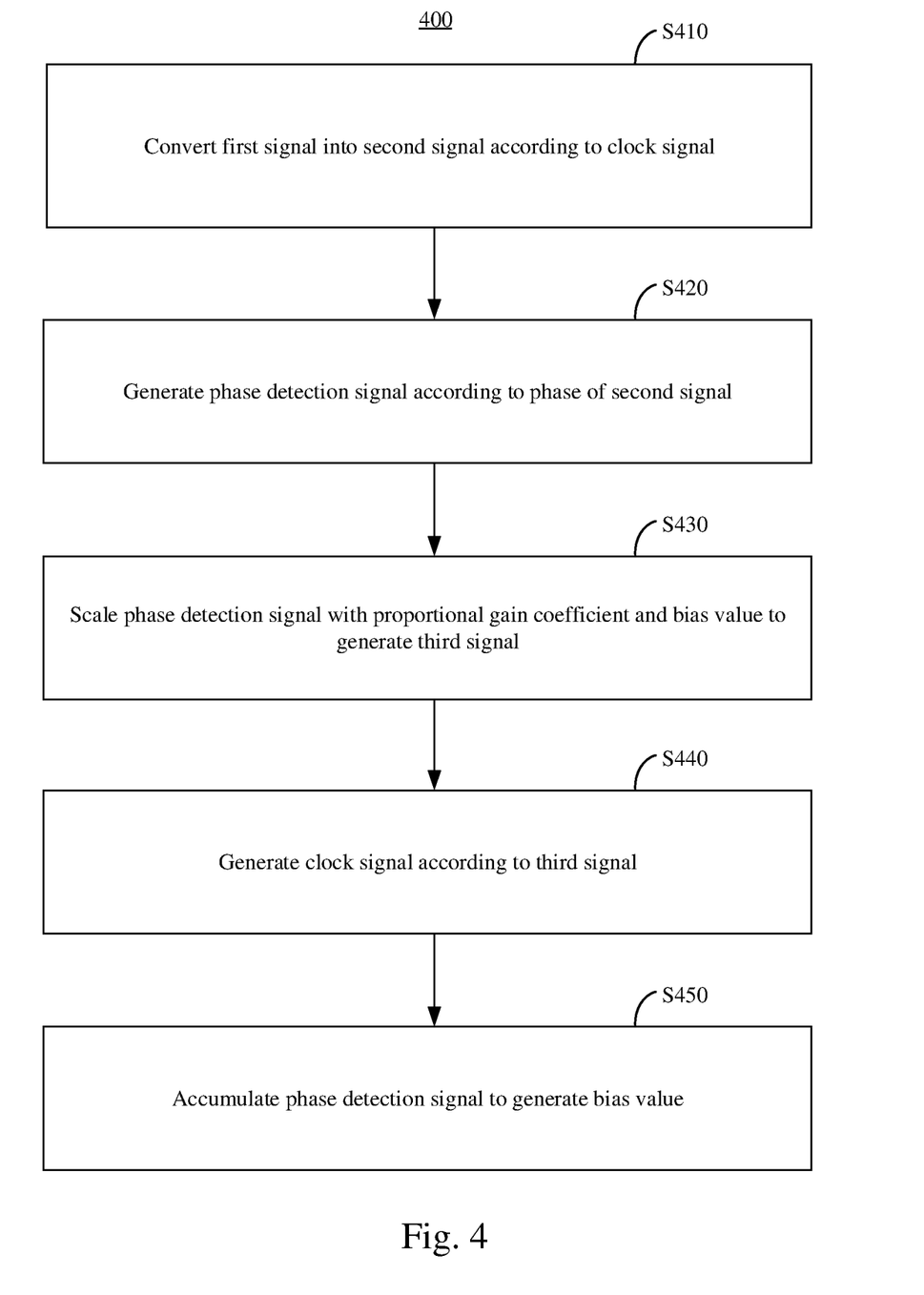
FIG. 4 illustrates a flowchart of operations of a clock and data recovery method according to some embodiments of the present disclosure.

FIG. 4 illustrates a flowchart of operations of a clock and data recovery method 400 according to some embodiments of the present disclosure. The clock and data recovery method 400 can be applied to the receiver 100 of the embodiment in FIG. 1. In operation S410, a first signal is converted into a second signal according to a clock signal. In operation S420, a phase detection signal is generated according to a phase of the second signal. In operation S430, the phase detection signal is scaled with a proportional gain coefficient and a bias value to generate a third signal. In operation S440, the clock signal is generated according to the third signal. In operation S450, the phase detection signal is accumulated to generate the bias value.

The above operations can be understood with reference to above embodiments, and thus the repetitious descriptions are not further given. The above description of the clock and data recovery method 400 includes exemplary operations, but the operations of the clock and data recovery method 400 are not necessarily performed in the order described above. Operations of the clock and data recovery method 400 may be added, replaced, changed order, and/or eliminated, or the operations of the clock and data recovery method 400 may be executed simultaneously or partially simultaneously as appropriate, in accordance with the spirit and scope of various embodiments of the present disclosure.

As described above, the receiver and the clock and data recovery method provided in some embodiments of the present disclosure may mainly utilize a first order loop filter circuit (which corresponds to a proportional path) to process phase errors and generate a bias value for correcting frequency errors in background. As a result, the latency introduced by the clock and data recovery mechanism of the receiver is relatively low, and thus the overall performance can be improved.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A receiver, comprising:
    an analog to digital converter circuit configured to convert a first signal into a second signal according to a clock signal;
    a phase detector circuit configured to detect a phase of the second signal to generate a phase detection signal;
    a digital loop filter circuit configured to scale the phase detection signal with a proportional path gain coefficient and a bias value to generate a third signal;
    a phase interpolator circuit configured to generate the clock signal according to the third signal; and
    a bias adaptation circuit configured to accumulate the phase detection signal to generate the bias value.

2. The receiver of claim 1, wherein the digital loop filter circuit is a first-order loop filter circuit.

3. The receiver of claim 1, wherein the digital loop filter circuit generates the third signal without employing an integral path.

4. The receiver of claim 1, wherein the digital loop filter circuit comprises a proportional path, and the bias value is to adjust an input or an output of the proportional path.

5. The receiver of claim 1, wherein the digital loop filter circuit comprises:
    an adder circuit configured to add the bias value and the phase detection signal to generate a fourth signal; and
    a multiplier circuit configured to multiply the fourth signal with the proportional path gain coefficient to generate the third signal.

6. The receiver of claim 1, wherein the digital loop filter circuit comprises:
    a multiplier circuit configured to multiply the phase detection signal with the proportional path gain coefficient to generate a fourth signal; and
    an adder circuit configured to add the bias value and the fourth signal to generate the third signal.

7. The receiver of claim 1, wherein the bias adaptation circuit comprises:
    a first multiplier circuit configured to multiply the phase detection signal with a first step size value to generate a fifth signal;
    a first adder circuit configured to add the fifth signal and a sixth signal to generate a seventh signal;
    an averaging circuit configured to accumulate the seventh signal for a predetermined interval and average the accumulated seventh signal to generate an averaging signal;
    a second multiplier circuit configured to multiply the averaging signal with a second step size value to generate the sixth signal, wherein the second step size value is higher than the first step size value;
    a second adder circuit configured to add the averaging signal and the bias value to update the bias value; and
    a register circuit configured to store the bias value.

8. The receiver of claim 7, wherein the bias adaptation circuit further comprises:
    a switch circuit configured to be selectively turned on according to a control signal to transmit the averaging signal to the second adder circuit; and
    an adaptive control circuit configured to output the control signal and a reset signal when the predetermined interval is expired,
    wherein the averaging circuit is further configured to clear the averaging signal according to the reset signal.

9. The receiver of claim 8, wherein the adaptive control circuit is configured to set the first step size value to be a first value and set the predetermined interval to be a first interval in an initial process of determining the averaging signal, and set the first step size value to be a second value and set the predetermined interval to be a second interval after the initial process is completed, the first value is smaller than the second value, and a duration of the second interval is longer than a duration of the first interval.

10. The receiver of claim 7, wherein the bias adaptation circuit further comprises:
    a third multiplier circuit configured to multiply the phase detection signal with the proportional path gain coefficient to generate an eighth signal,
    wherein the first multiplier circuit is configured to multiply the eighth signal with the first step size value to generate the fifth signal.

11. The receiver of claim 7, wherein the second step size value is a difference between a value of 1 and the first step size value.

12. A clock and data recovery method, comprising:
    converting a first signal into a second signal according to a clock signal;
    generating a phase detection signal according to a phase of the second signal;

scaling the phase detection signal with a proportional path gain coefficient and a bias value to generate a third signal;

generating the clock signal according to the third signal; and accumulating the phase detection signal to generate the bias value.

13. The clock and data recovery method of claim 12, wherein the phase detection signal is scaled by a digital loop filter circuit, and the digital loop filter circuit is a first-order loop circuit.

14. The clock and data recovery method of claim 12, wherein the phase detection signal is scaled by a digital loop filter circuit, and the digital loop filter circuit generates the third signal without employing an integral path.

15. The clock and data recovery method of claim 12, wherein the phase detection signal is scaled by a digital loop filter circuit, the digital loop filter circuit comprises a proportional path, and the bias value is to adjust an input or an output of the proportional path.

16. The clock and data recovery method of claim 12, wherein scaling the phase detection signal with the proportional path gain coefficient and the bias value to generate the third signal comprises:

adding the bias value and the phase detection signal to generate a fourth signal; and multiplying the fourth signal with the proportional path gain coefficient to generate the third signal.

17. The clock and data recovery method of claim 12, wherein scaling the phase detection signal with the proportional path gain coefficient and the bias value to generate the third signal comprises:

multiplying the phase detection signal with the proportional path gain coefficient to generate a fourth signal; and adding the bias value and the fourth signal to generate the third signal.

18. The clock and data recovery method of claim 12, wherein accumulating the phase detection signal to generate the bias value comprises:

multiplying the phase detection signal with a first step size value to generate a fifth signal;

adding the fifth signal and a sixth signal to generate a seventh signal;

accumulating the seventh signal for a predetermined interval and averaging the accumulated seventh signal to generate an averaging signal;

multiplying the averaging signal with a second step size value to generate the sixth signal, wherein the second step size value is higher than the first step size value;

adding the averaging signal and the bias value to update the bias value; and storing the bias value.

19. The clock and data recovery method of claim 18, wherein accumulating the phase detection signal to generate the bias value further comprises:

selectively turned on a switch according to a control signal to transmit the averaging signal to an adder circuit, wherein the adder circuit is configured to add the averaging signal and the bias value to update the bias value;

outputting the control signal and a reset signal when the predetermined interval is expired; and clearing the averaging signal according to the reset signal.

20. The clock and data recovery method of claim 18, further comprising:

setting the first step size value to be a first value and setting the predetermined interval to be a first interval in an initial process of determining the averaging signal; and setting the first step size value to be a second value and setting the predetermined interval to be a second interval after the initial process is completed, wherein the first value is smaller than the second value, and a duration of the second interval is longer than a duration of the first interval.

\* \* \* \* \*